US009311040B2

(12) United States Patent
Kogure

(10) Patent No.: US 9,311,040 B2
(45) Date of Patent: Apr. 12, 2016

(54) SYSTEM, CONTROL METHOD FOR SAME, AND IMAGE PROCESSING APPARATUS

(71) Applicant: CANON KABUSHIKI KAISHA, Tokyo (JP)

(72) Inventor: Takeshi Kogure, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/612,700

(22) Filed: Feb. 3, 2015

(65) Prior Publication Data
US 2015/0242163 A1 Aug. 27, 2015

(30) Foreign Application Priority Data

Feb. 24, 2014 (JP) ................. 2014-033300

(51) Int. Cl.
*G06F 3/12* (2006.01)
(52) U.S. Cl.
CPC ............ *G06F 3/1292* (2013.01); *G06F 3/1204* (2013.01); *G06F 3/1225* (2013.01); *G06F 3/1228* (2013.01); *G06F 3/1268* (2013.01)
(58) Field of Classification Search
USPC ................................. 358/1.14, 1.15
See application file for complete search history.

(56) References Cited

U.S. PATENT DOCUMENTS

| 7,619,764 B2* | 11/2009 | Fukunaga | G06F 3/1288 358/1.15 |
|---|---|---|---|
| 8,332,837 B2 | 12/2012 | Nakata | |
| 8,842,320 B2* | 9/2014 | Kitagata | G06F 3/1204 358/1.14 |
| 2005/0088689 A1* | 4/2005 | Suga | H04N 1/00278 358/1.15 |
| 2005/0174600 A1* | 8/2005 | Kitahara | H04N 1/00196 358/1.15 |
| 2006/0268328 A1* | 11/2006 | Park | G03G 15/5029 358/1.15 |
| 2009/0240703 A1* | 9/2009 | Yoshino | G06F 17/3028 |
| 2012/0314245 A1* | 12/2012 | Nakashima | H04N 1/00244 358/1.15 |
| 2013/0132599 A1* | 5/2013 | Nakashima | H04L 67/34 709/230 |

FOREIGN PATENT DOCUMENTS

JP 2005-338940 12/2005

* cited by examiner

*Primary Examiner* — Allen H Nguyen
(74) *Attorney, Agent, or Firm* — Fitzpatrick, Cella, Harper & Scinto

(57) ABSTRACT

Provided is a system that includes an information processing apparatus; and an image processing apparatus. The image processing apparatus includes a transmitting unit configured to transmit a script for transmitting image data which is generated by rendering content displayed on the browser of the information processing apparatus through execution of the script by the information processing apparatus to the image processing apparatus in response to a request from the information processing apparatus. The information processing apparatus includes a transmitting unit configured to transmit the image data generated through execution of the script by the browser to the image processing apparatus. The image processing apparatus further includes a printing unit configured to perform printing based on the image data.

11 Claims, 18 Drawing Sheets

FIG. 13

```
{
    "command": [
        {
            "commandName": "printDocument"
        },
        {
            "commandParam": [
                {
                    "jobId": 1
                },
                {                                      1301
                    "document": {
                        "data" : BASE64-converted image data
                    }
                }
            ]
        }
    ]
}
```

FIG. 14

```
{
    "command": [
        {
            "commandName": "printDocument"
        },
        {
            "commandParam": [
                {
                    "jobId": 1
                },
                {                                    1401
                    "document": {
                        "data" : [
                            divided BASE64-converted image data 1,
                            divided BASE64-converted image data 2,
                                    ....
                            divided BASE64-converted image data n
                        ]
                    }
                }
            ]
        }
    ]
}
```

SYSTEM, CONTROL METHOD FOR SAME, AND IMAGE PROCESSING APPARATUS

BACKGROUND OF THE INVENTION

1. Field of the Invention

The present invention relates to a system, a control method for the system, and an image processing apparatus.

2. Description of the Related Art

Conventionally, there is known a function that transmits image data generated by a client computer to an image processing system via LAN (Local Area Network) so as to perform processing such as printing by an image processing apparatus. In this case, a driver for controlling the image processing apparatus needs to be installed in advance in the client computer.

Japanese Patent Laid-Open No. 2005-338940 discloses a function that provides a driver to be installed in the client computer side to a server and causes the server to provide a driver for the relevant image processing apparatus if the request of the driver is made from the client computer (Japanese Patent Laid-Open No. 2005-338940).

However, since a different driver is required for each OS in each client computer as disclosed in Japanese Patent Laid-Open No. 2005-338940, a new driver needs to be provided if the version of the OS of the relevant client computer is updated. Consequently, the image processing apparatus may not be used until the new driver is provided.

SUMMARY OF THE INVENTION

The present invention provides an image processing apparatus that is capable of printing content displayed on the browser without dependence on an OS on the information processing apparatus side.

According to an aspect of the present invention, a system is provided that includes an information processing apparatus; and an image processing apparatus, wherein the image processing apparatus includes a transmitting unit configured to transmit a script for transmitting image data which is generated by rendering content displayed on the browser of the information processing apparatus through execution of the script by the information processing apparatus to the image processing apparatus in response to a request from the information processing apparatus, wherein the information processing apparatus includes a transmitting unit configured to transmit the image data generated through execution of the script by the browser to the image processing apparatus, and wherein the image processing apparatus further includes a printing unit configured to perform printing based on the image data.

Further features of the present invention will become apparent from the following description of exemplary embodiments with reference to the attached drawings.

BRIEF DESCRIPTION OF THE DRAWINGS

FIG. 13 is a diagram illustrating image transmission data to an MFP.
FIG. 14 is a diagram illustrating image transmission data to an MFP.

DESCRIPTION OF THE EMBODIMENTS

Hereinafter, preferred embodiments of the present invention will be described in detail with reference to the drawings. The following embodiments do not impose any limitations on the scope of the invention described in claims. Furthermore, all of the configurations shown in the following embodiments are not necessarily essential as solving means for the invention described in claims.

Figure 1:
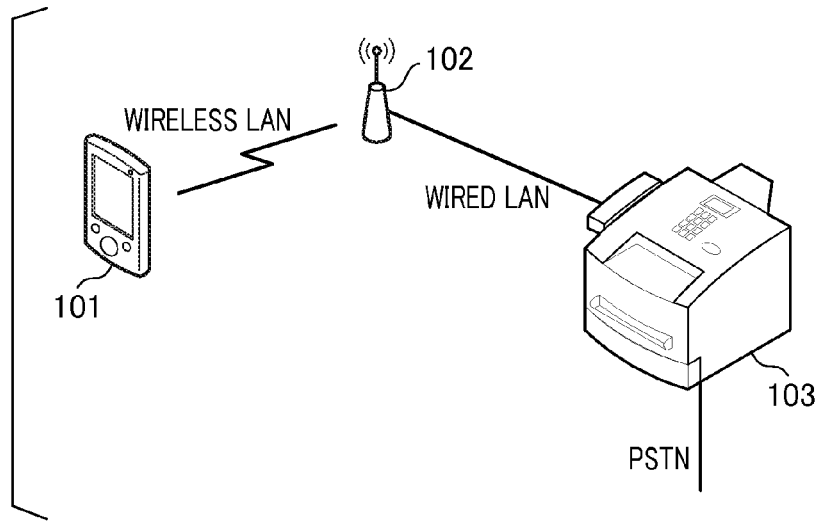
FIG. 1 is a diagram illustrating the overall network.

Firstly, a description will be given of the overall system according to the present embodiment with reference to FIG. 1. FIG. 1 is a diagram illustrating the overall network. A tablet terminal 101 which is an exemplary information processing apparatus communicates with an MFP 103 via a wireless network router (wireless access point) 102. The MFP 103 is an exemplary image processing apparatus. The MFP 103 itself may be referred to as an "image processing system" or the entirety including the MFP 103 and the tablet terminal 101 may also be referred to as an "image processing system". The tablet terminal 101 and the wireless network router 102 are connected to each other through a wireless LAN (Local Area Network). The MFP 103 and the wireless network router 102 are connected to each other through a wired LAN.

Note that the communication path between the tablet terminal 101 and the MFP 103 is not limited to the above examples. For example, the tablet terminal 101 and the wireless network router 102 may also be connected to each other through a wired LAN, and the MFP 103 and the wireless network router 102 may also be connected to each other through a wireless LAN. Furthermore, the tablet terminal 101 and the MFP 103 may also be connected to each other over the same network.

Figure 2:
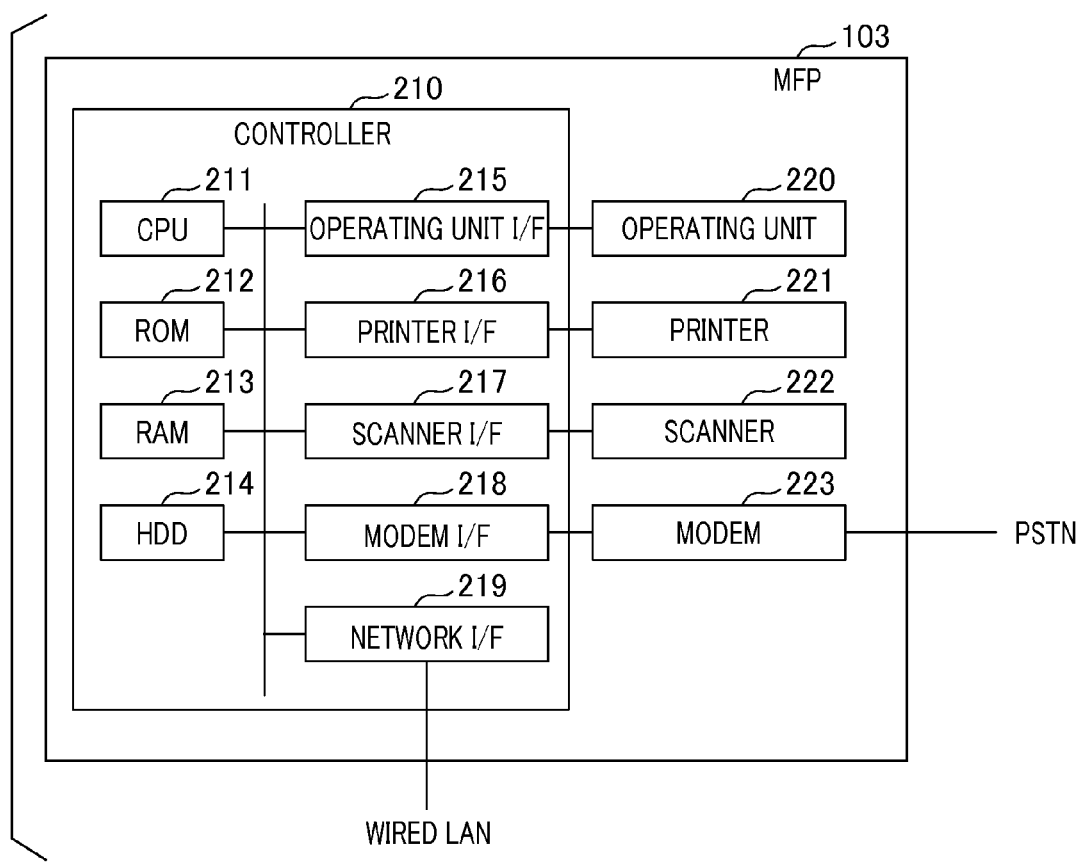
FIG. 2 is a hardware configuration diagram of an MFP.

FIG. 2 is a hardware configuration diagram of the MFP 103. A controller 210 including a CPU (Central Processing Unit) 211 controls the overall operation of the MFP 103. The CPU 211 performs various types of control such as reading/printing/communication by reading a control program stored in a ROM (Read Only Memory) 212. A RAM (Random Access Memory) 213 is used as a temporal storage area such as a main memory, a work area, or the like for the CPU 211. Although it is assumed that the MFP 103 executes the respective processings shown in the flowchart to be described below such that one CPU 211 uses one memory (RAM 213 or HDD (Hard Disk Drive) 214), the MFP 103 may also be configured in another manner. For example, the respective processings shown in the flowchart may also be executed by causing a plurality of CPUs and a plurality of RAMs or HDDs to cooperate with each other.

The HDD 214 stores image data or various programs. An operating unit I/F 215 connects an operating unit 220 to the controller 210. The operating unit 220 is provided with a liquid crystal display unit having a touch panel function, a keyboard, or the like and serves as a receiving unit configured to receive an operation/input/instruction from a user. A printer I/F 216 connects a printer 221 to the controller 210. Image data to be printed by the printer 221 is transferred from the controller 210 via the printer I/F 216 and then is printed on a recording medium by the printer 221. A scanner I/F 217 connects a scanner 222 to the controller 210. The scanner 222 reads an image on a document and generates image data. A network I/F 219 connects the controller 210 (the MFP 103) to the wired LAN. The MFP 103 is capable of transmitting/receiving image data and various types of information to/from an external device using the network I/F 219.

Figure 3:
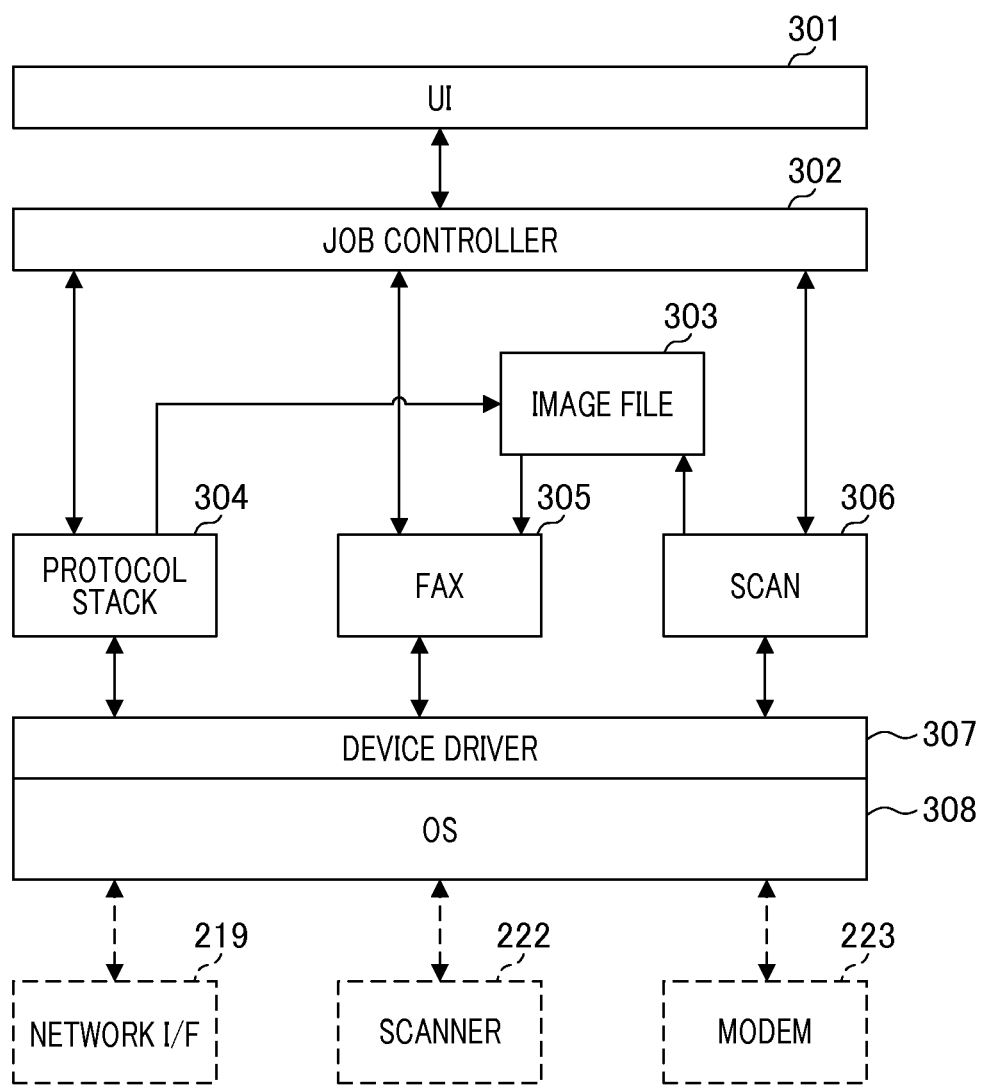
FIG. 3 is a software configuration diagram of an MFP.

FIG. 3 is a software configuration diagram of the MFP 103. The respective units shown in solid lines in FIG. 3 are software modules which are realized by causing the CPU 211 to read and execute programs stored in the ROM 212 or the HDD 214. A UI (User Interface) unit 301 provides various types of information to a user via the operating unit 220 and receives various types of instructions from a user. A Job Controller unit 302 receives a job such as copy, print, fax, or the like and controls execution of the received job. A Protocol Stack unit 304 holds various types of network protocols such as TCP/IP, HTTP (Hypertext Transfer Protocol), or the like.

In the present embodiment, image data transmitted from the tablet terminal 101 is received via the network I/F 219 in accordance with the network protocol held in the Protocol Stack unit 304. The received image data is stored in an Image File unit 303. The Image File unit 303 is a software module that manages image data stored in the RAM 213 or the HDD 214.

The Image File unit 303 stores not only image data received via the network I/F unit 219 but also image data generated by the scanner 222. Generation of image data by the scanner 222 is controlled by a Scan unit 306. An OS (Operating System) unit 308 adjusts the modules and tasks so as to manage the overall software of the MFP 103. The OS unit 308 is coupled with a Device Driver unit 307. The Device Driver unit 307 controls hardware devices such as the scanner 222, a modem 223, and the like.

Figure 4:
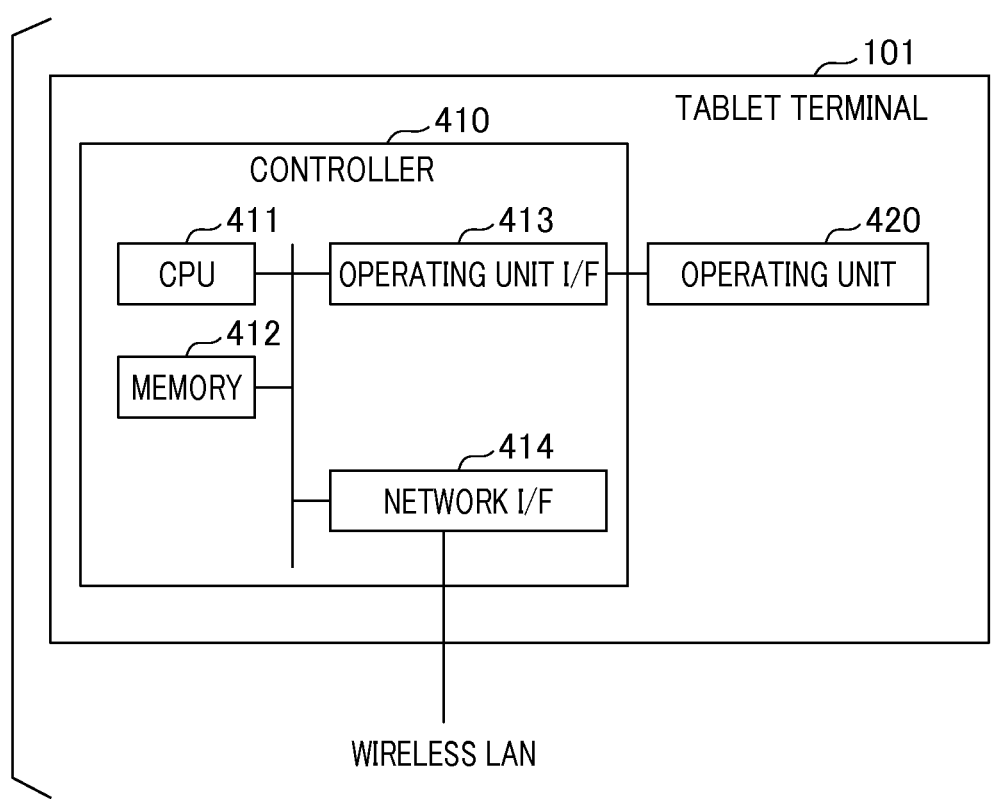
FIG. 4 is a hardware configuration diagram of a tablet terminal.

FIG. 4 is a hardware configuration diagram of the tablet terminal 101. A controller 410 including a CPU (Central Processing Unit) 411 controls the overall operation of the tablet terminal 101. The CPU 411 performs various types of control by reading a control program stored in a memory 412. The memory 412 is also used as a temporal storage area such as a main memory, a work area, or the like for the CPU 411. Although it is assumed that the tablet terminal 101 executes the respective processings such that one CPU 411 uses one memory 412, the tablet terminal 101 may also be configured in another manner. For example, the respective processings may also be executed by causing a plurality of CPUs and a plurality of RAMs or HDDs to cooperate with each other.

An operating unit I/F 413 connects an operating unit 420 to the controller 410. The operating unit 420 is provided with a liquid crystal display unit having a touch panel function and serves as a receiving unit configured to receive an operation/input/instruction from a user. A network I/F 414 connects the controller 410 (the tablet terminal 101) to the wireless LAN. The tablet terminal 101 is capable of transmitting/receiving image data and various types of information to/from an external device using the network I/F 414.

Figure 5:
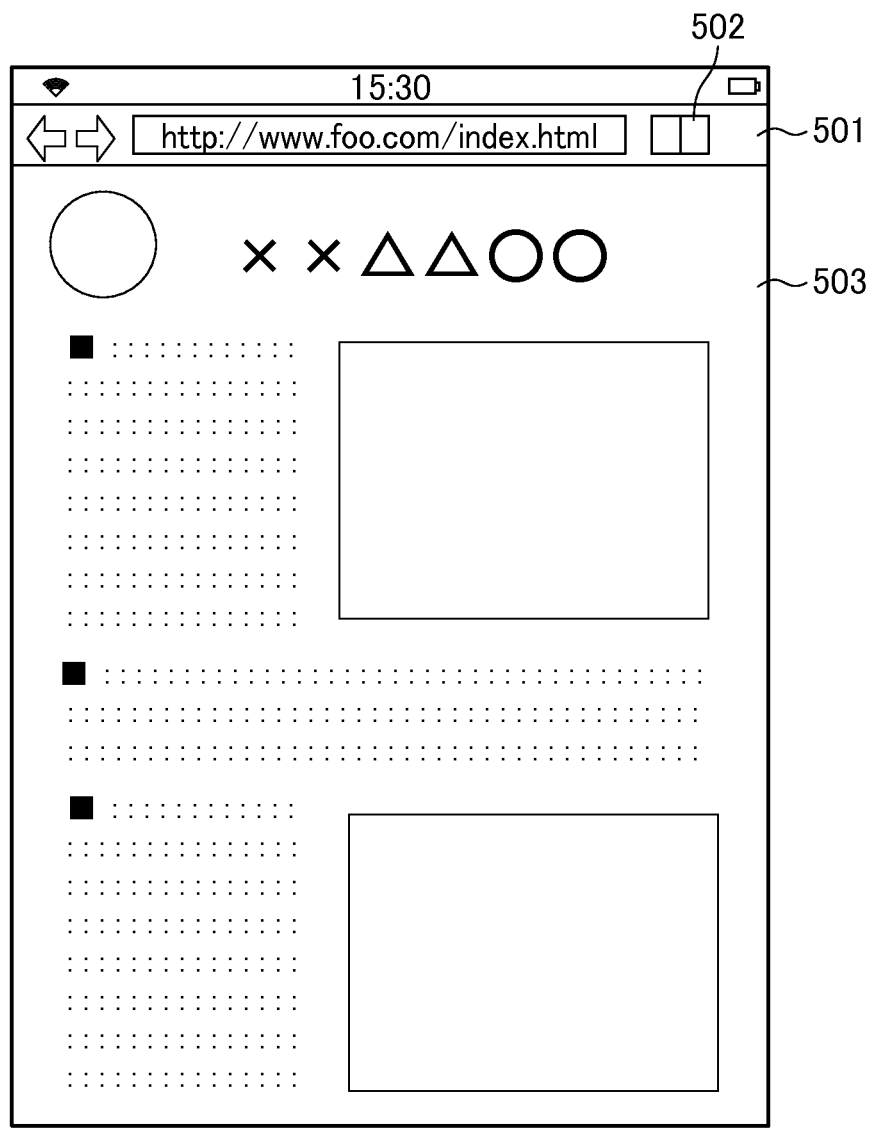
FIG. 5 is a diagram illustrating an operation screen of a tablet terminal.

FIG. 5 is a diagram illustrating an operation screen of a Web browser to be displayed on the tablet terminal 101. The Web browser is an application that is capable of downloading various types of content from a server on the Internet so as to display it on the tablet terminal 101 and is software that is operated on the OS unit 308. The Web browser not only displays content by downloading it but also has a function that interprets and executes JavaScript (registered trademark) (hereinafter simply referred to as "script") included in the downloaded content (HTML). The Web browser also has a bookmark function that is capable of easily calling the URL of a Web page to be frequently displayed by storing it. Furthermore, the Web browser has a bookmarklet function that registers a script in a bookmark and then processes the registered script by selecting the bookmark.

Figure 6:
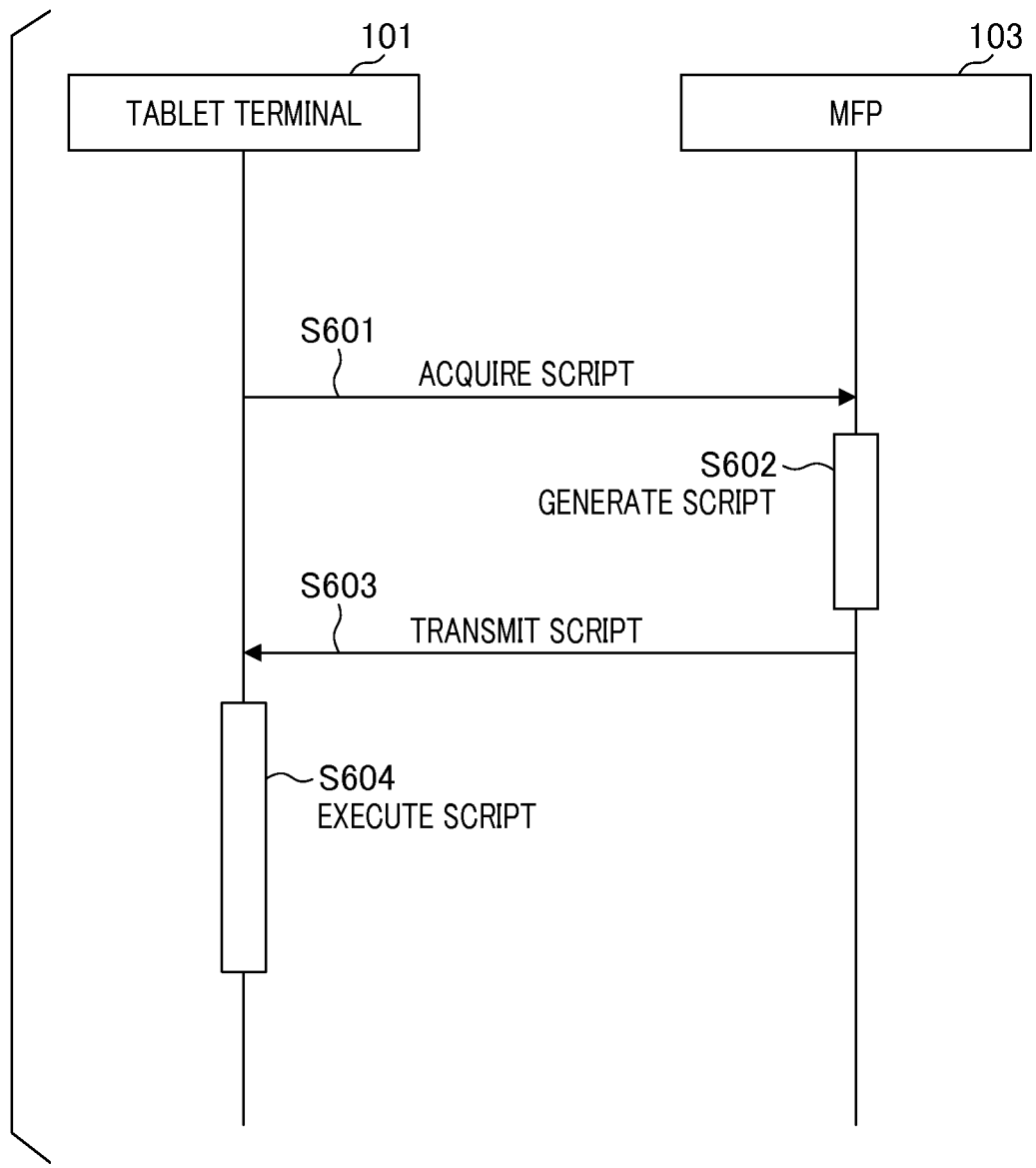
FIG. 6 is a flowchart illustrating print processing.

Although the web page is switched to the page of the registered URL in the case of selecting a normal bookmark, a script registered in a bookmarklet is executed on currently displayed content in the case of selecting a bookmarklet. A user registers in advance a print start script for performing processing shown in FIG. 6 as a bookmarklet in the terminal. The processing shown in FIG. 6 is executed by selecting the pre-registered bookmarklet. A return button, an advance button, a current URL, a bookmark button, or the like is displayed on a header 501. A list of registered bookmarks is displayed upon selection of a bookmark button 502. A bookmark is executed by selecting it from the bookmarks displayed as a list. Various types of downloaded content are displayed on a content display area 503. Note that the script of the present embodiment is a script for transmitting an image to an image processing apparatus by rending a Web page being displayed upon reception of access from a browser.

FIG. 6 is a flowchart illustrating print start processing between the tablet terminal 101 and the MFP 103. Firstly, a script acquisition request for print control is made to the MFP 103 in step S601. At this time, language information (more specifically, charset information in a meta-tag) of the content being displayed and language environment information (more specifically, HTTP_ACCEPT_LANGUAGE information) set in the browser are sent together to the MFP 103. In this manner, a print setting dialogue 801 shown in FIG. 8 to be described below is displayed by a language corresponding to the language environment information. Access enabled/disabled information about enablement/disablement of access to elements within iframe (frame) to be described below is also sent together to the MFP 103. Note that iframe is a function for displaying another page within one Web page being displayed on the browser screen.

In step S602, the MFP 103 which has received the request generates a print control script to which control for displaying a print setting dialogue corresponding to the received language environment information is added. The print control script generation processing will be described below with reference to FIG. 20. Next, in step S603, the MFP 103 sends the generated print control script back to the tablet terminal 101. In step S604, the tablet terminal 101 which has received the print control script executes the print control script. At this time, a print setting default value held in the print start script is passed to the print control script. The default value is used in step S1101 to be described below in FIG. 11.

Figure 7:
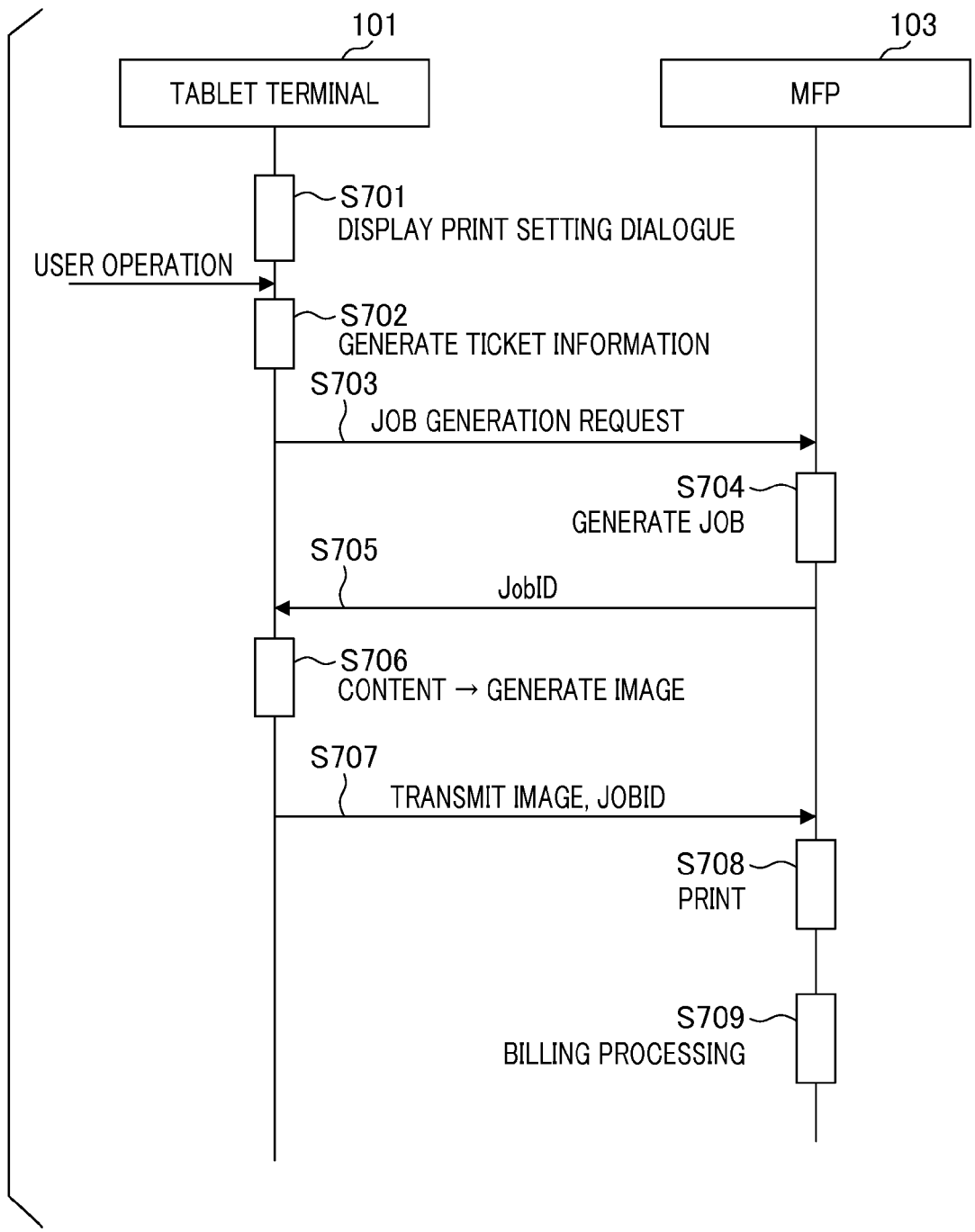
FIG. 7 is a flowchart illustrating script processing.
Figure 8:
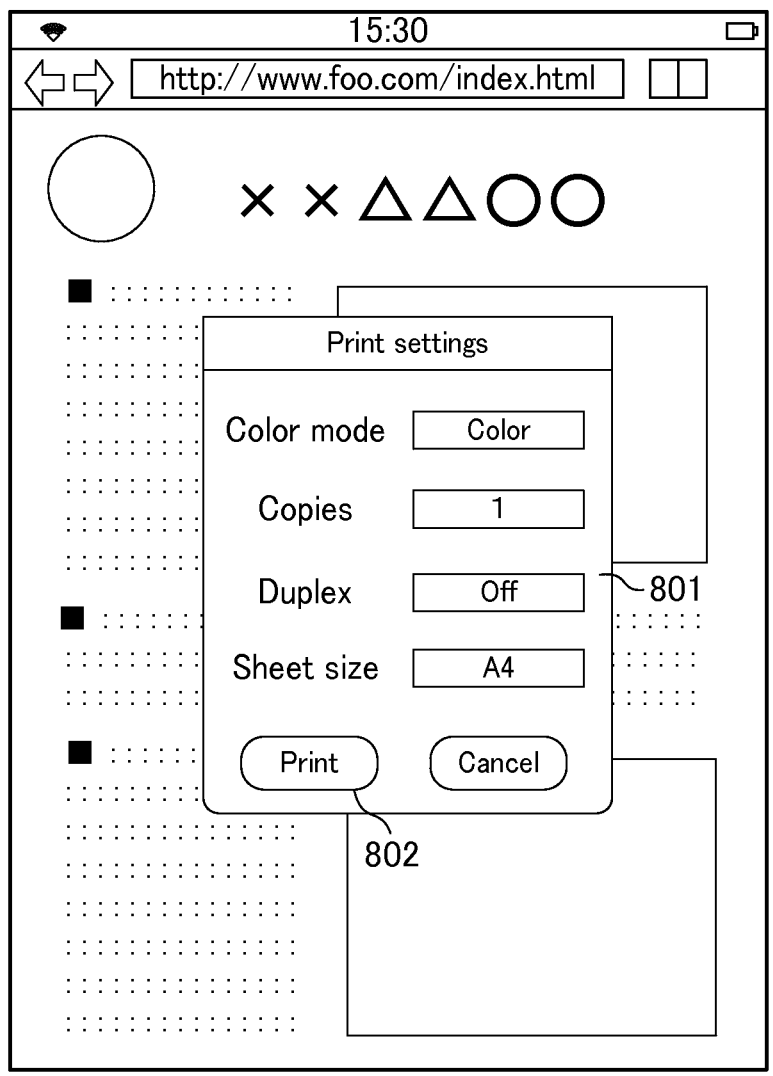
FIG. 8 is a diagram illustrating a print setting dialogue of a tablet terminal.

FIG. 7 is a flowchart illustrating print processing by a print control script. Firstly, the print setting dialogue to be described below in FIG. 8 is displayed in step S701. A user makes settings in accordance with the objective using the print setting dialogue. After completion of print settings set by a user, the tablet terminal 101 generates ticket information according to the print settings in step S702. Next, a job generation request is made to the MFP 103 by transmitting the generated ticket information thereto in step S703. The MFP 103 which has received the job generation request generates a job from ticket information in step S704, and sends the job generation result and the job ID back to the tablet terminal 101 in step S705.

At this time, if the MFP 103 performs billing management, the MFP 103 determines to offer a charge from which section (e.g., which department) based on ticket information and holds billing target information. Upon reception of the job generation result, the tablet terminal 101 converts the currently displayed content into image data in step S706. Next, the tablet terminal 101 transmits the image data as print data to the MFP 103 in step S707, and the MFP 103 which has received the image data performs printing in step S708. Next, if the MFP 103 performs billing management processing, billing processing is performed for the billing target held in step S704 in step S709.

FIG. 8 is a diagram illustrating the print setting dialogue 801 displayed in step S701. A user sets items displayed in accordance with the objective and, for example, selects a print button 802 upon printing. Upon selection of the print button 802, the processing shifts to step S703 by the print control script. Note that the dialogue is dynamically generated by the print control script. At this time, a message displayed on the print setting dialogue is displayed in accordance with the language environment of the user specified in step S601. More specifically, a setting dialogue is generated as the iframe of HTML.

An iframe has a structure for using one independent HTML, and a language code for usage can be specified in the HTML. In this manner, even if the content is displayed in any language, a message can be displayed in accordance with the language environment for browser. However, for example, if an iframe is handled by JavaScript (registered trademark), an access to elements within the iframe may be limited depending on the JavaScript (registered trademark) engine used by the tablet terminal 101. In this case, it becomes difficult to control using the print control script. Hence, the print setting dialogue is displayed by using div of HTML instead of an iframe so as to avoid such a phenomenon. In this case, a language cannot be specified in contrast to the case of an iframe, a language which can be used in the print setting dialogue may be garbled if the language in HTML content being displayed is not used.

Figure 20:
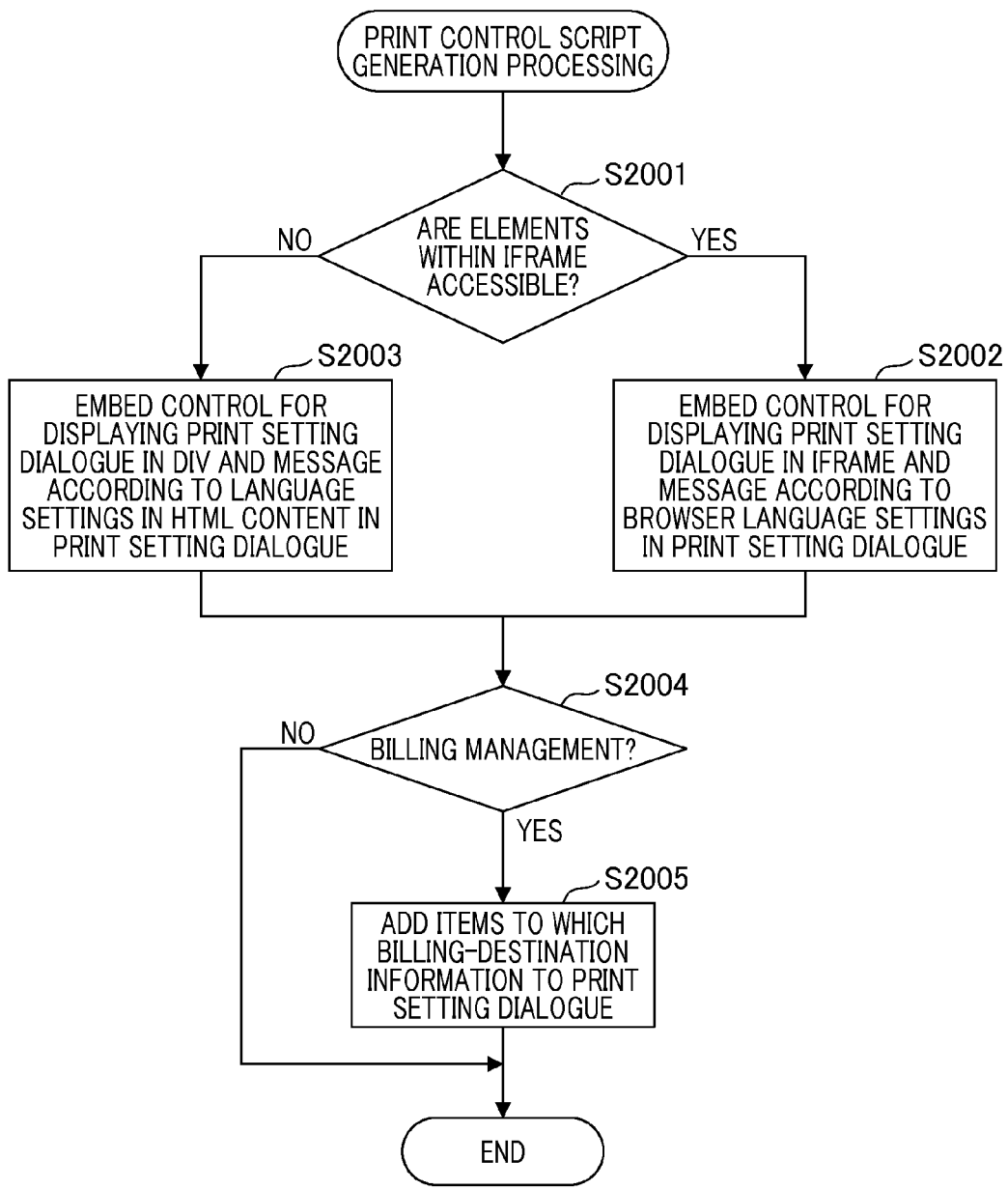
FIG. 20 is a flowchart illustrating script generation processing.

Here, a description will be given of the details of script generation processing in step S602 shown in FIG. 6 with reference to FIG. 20. FIG. 20 is a flowchart for generating a print control script including display control for the print setting dialogue. Firstly, it is determined in step S2001 as to whether or not elements within an iframe transmitted from the tablet terminal 101 are accessible. In other words, it is determined as to whether or not the print setting dialogue can be displayed as another page. If accessible (YES), the processing proceeds to step S2002, whereas if inaccessible (inaccessible, i.e., undisplayable as another page) (NO), the processing proceeds to step S2003. Then, control for displaying the print setting dialogue in the iframe and a message according to the browser language settings are embedded in the print setting dialogue in step S2002.

On the other hand, control for displaying the print setting dialogue in the element such as div and a message according to the language settings in HTML content are embedded in the print setting dialogue in step S2003. Next, it is determined in step S2004 as to whether or not the MFP 103 performs billing management (i.e., presence/absence of billing management). If billing is made (YES), the processing proceeds to step S2005. If no billing is made (NO), the processing ends. Items to which billing information (e.g., department ID and password) can be input are added to the print setting dialogue in step S2005. Such control is made so that the print setting dialogue can be displayed without being garbled. If billing management is required, information required in the print setting dialogue can be input to the items. Then, the processing ends.

Figure 9:
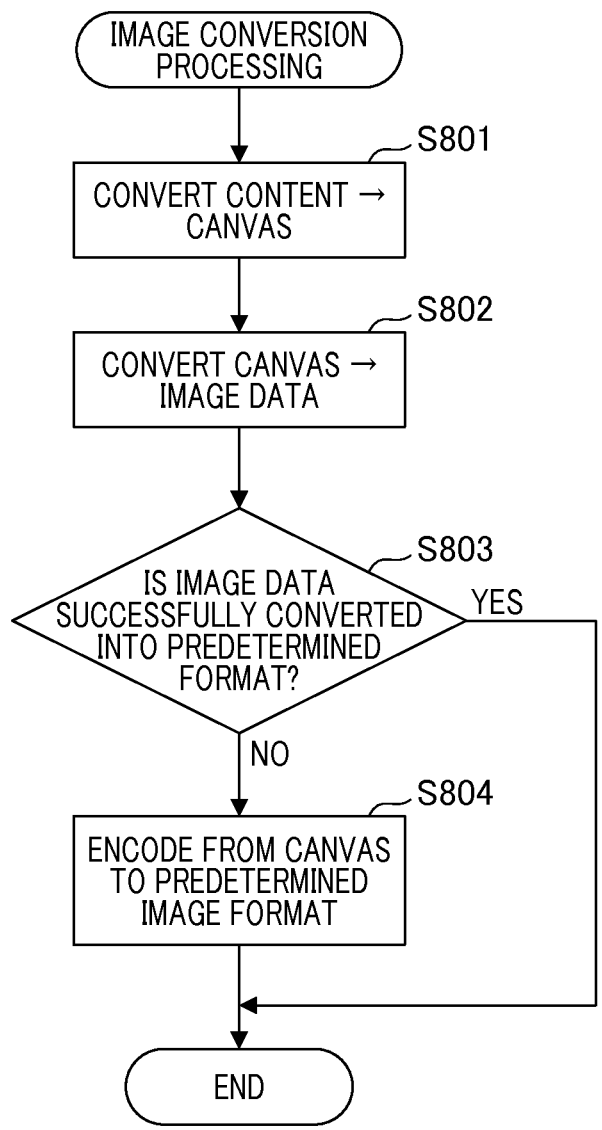
FIG. 9 is a flowchart illustrating image conversion processing.

Next, a description will be given of the detail of processing for generating image data from content in step S706 in FIG. 7 with reference to FIG. 9. FIG. 9 is a flowchart illustrating image data generation processing. Firstly, the currently displayed content is converted into an image on the HTML Canvas in step S801. Next, the converted image on the Canvas is converted into image data in a format compatible with the MFP 103 in step S802. At this time, for example, the JavaScript (registered trademark) toDataURL( ) method is known for usage. However, the toDataURL( ) method does not necessarily support the image format compatible with the MFP 103. The image format supported by the toDataURL( ) method is dependent on the environment of the JavaScript (registered trademark) engine. The Web page being displayed by the browser is subject to rendering in steps S801 and S802.

Thus, if it is determined in step S803 that the image data was unsuccessfully converted into the requested image format (NO), the processing proceeds to step S804. Encode control for converting Canvas into image data is subject to script processing without using the toDataURL( ) method in step S804. Since the processing is generally performed by the JavaScript (registered trademark) engine native in the toDataURL( ) method, the processing may be performed at a higher speed than that of the processing for processing encode control by JavaScript (registered trademark). In this manner, high speed conversion processing may be performed as long as the format is supported by toDataURL( ) but conversion processing may also be performed even in the format not supported by toDataURL( ) although it may take time. Here, content is converted into an image on the HTML Canvas. However, if the image format supported by MFP is a vector format such as PDF, SVG (Scalable Vector Graphics), or the like, content may also be directly converted into a vector format without converting it into an image on the HTML Canvas.

Figure 10:
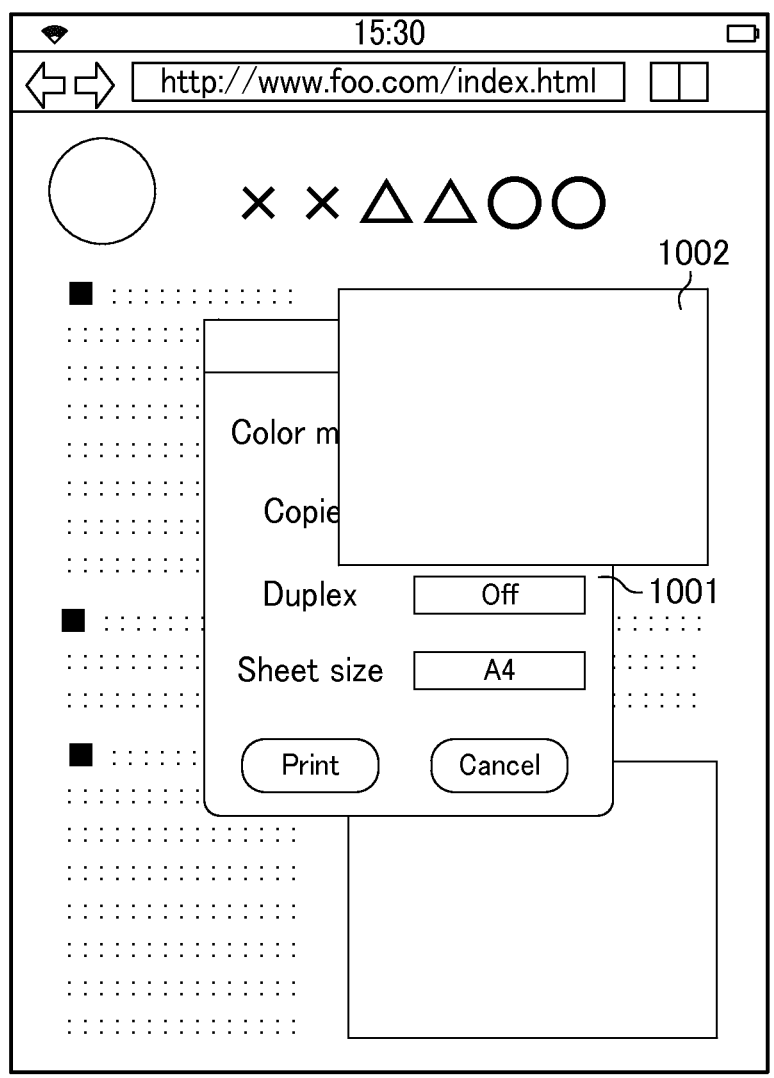
FIG. 10 is a diagram illustrating an operation screen of a tablet terminal.

FIG. 10 shows a display image in the case where the overlay order of an HTML element 1002 is greater than the overlay order of a print setting dialogue 1001. The HTML element has a concept of overlay order, and thus, when an element having a larger overlay order than that of a print setting dialogue is overlaid thereon, the print setting dialogue is hidden as shown in FIG. 10.

Figure 11:
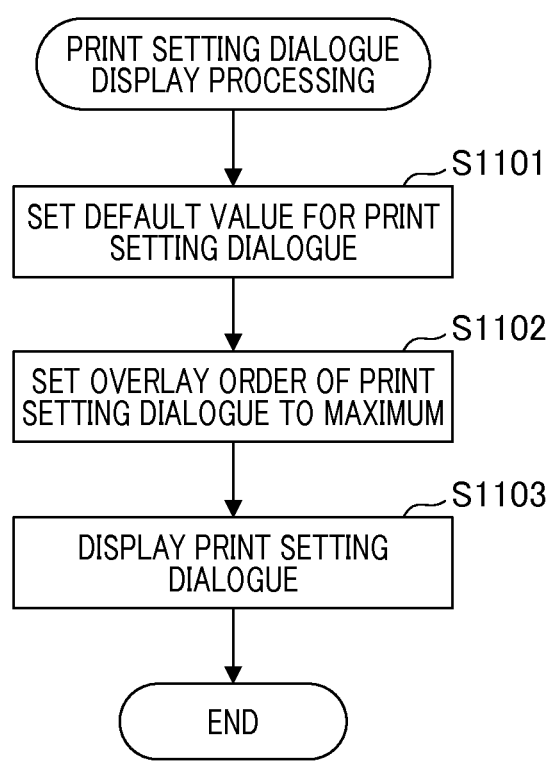
FIG. 11 is a flowchart illustrating print setting dialogue display processing.

Next, FIG. 11 is a flowchart illustrating print setting dialogue display processing by taking into account the overlay concept. Firstly, various setting values (color mode, copies, and the like) for the print setting dialogue are set to default values in step S1101. At this time, the default values transmitted in step S604 shown in FIG. 6 are used. Next, the overlay order of the print setting dialogue is set to maximum in step S1102. Then, the print setting dialogue is displayed in step S1103. In this manner, the print dialogue can be displayed without being hidden by other HTML elements.

Figure 12:
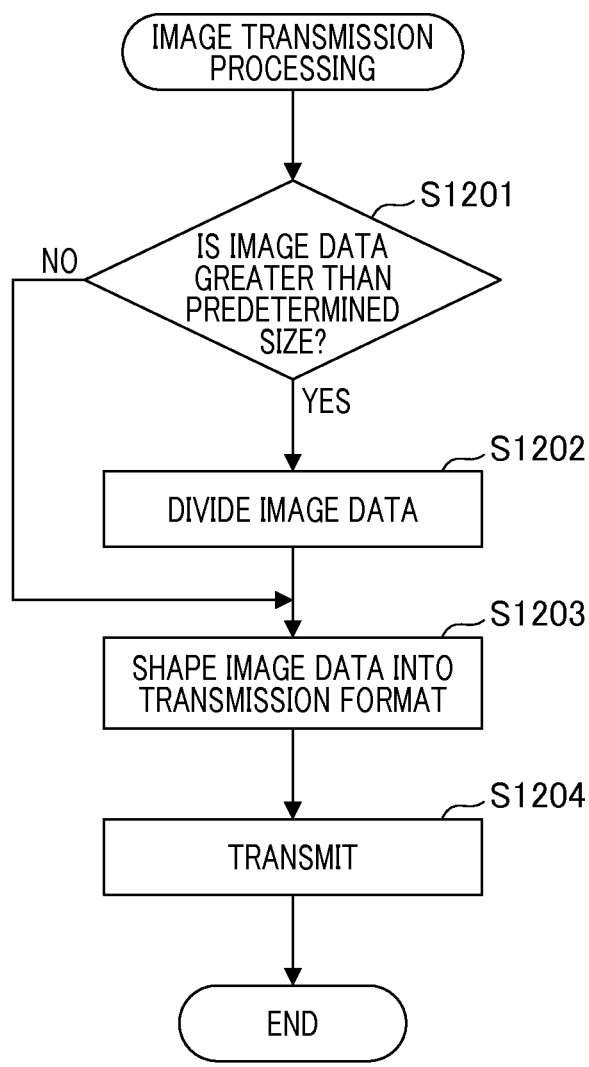
FIG. 12 is a flowchart illustrating image transmission processing.

FIG. 12 is a flowchart illustrating the detail of image transmission processing in step S707 shown in FIG. 7. Upon transmitting image data to the MFP 103, information such as Job ID is transmitted together with image data as shown in FIG. 13 to be described below. The MFP 103 parses (syntactic analysis) the received data to perform processing for taking image data out therefrom. Software incorporated into MFP or the like has a small amount of memory to be treated as compared with software for PC. Thus, the maximum size of one mass of data upon parsing is limited.

In general, image data has a large size. Thus, if all of image data is transmitted as one mass from the tablet terminal 101, the maximum size of one mass of data capable of being parsed by the MFP 103 may exceed. Thus, image transmission processing performs transmission control by dividing image data into data blocks of small size. Firstly, it is determined in step S1201 as to whether or not image data exceeds a predetermined size which is capable of being parsed by the MFP 103. If image data exceeds a predetermined size (YES), the processing proceeds to step S1202, whereas if image data does not exceed a predetermined size (NO), the processing proceeds to step S1203. Next, image data is divided into data blocks of a predetermined size in step S1202. Then, the resulting data blocks are shaped into a transmission format for transmitting them to the MFP 103 in step S1203. Finally, the shaped data is transmitted to the MFP 103 in step S1204. Then, the processing ends.

FIG. 13 is a diagram illustrating an example of data format used upon transmitting image data from the tablet terminal 101 to the MFP 103. Image data includes information (e.g., commandName: printDocument) indicating that data to be transmitted is what type of data, information (e.g., jobID: 1) indicating that data to be transmitted is data for which job, and information (e.g., document: data) indicating the content of image data. Here, if BASE64-converted image data 1301 exceeds a predetermined size, the image data 1301 cannot be parsed by the MFP 103 as described above. While, in the present embodiment, a JSON (JavaScript (registered trademark) Object Notation) format is used as data format, other format such as XML may also be used.

FIG. 14 is a diagram illustrating an example of a data format by taking into account a predetermined size upon transmitting image data from the tablet terminal 101 to the MFP 103. As shown in FIG. 14, the data format includes divided BASE64-converted image data 1401 indicating that image data is divided into n blocks of data so as to fall within a predetermined size.

Figure 15:
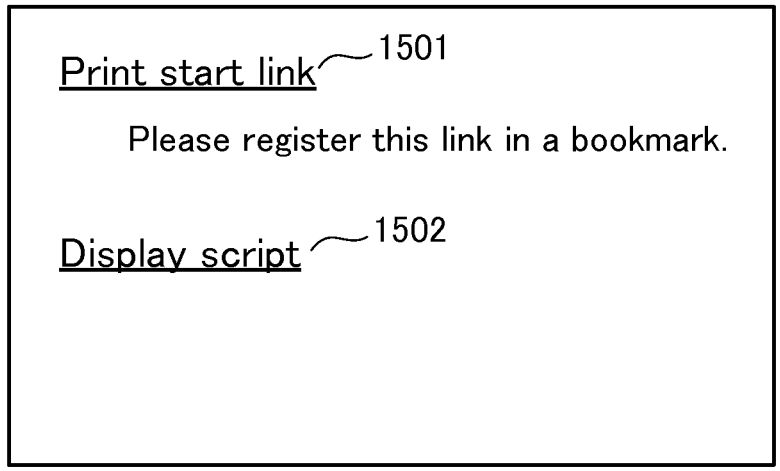
FIG. 15 is a diagram illustrating an example of content to be displayed on a tablet terminal.
Figure 16:
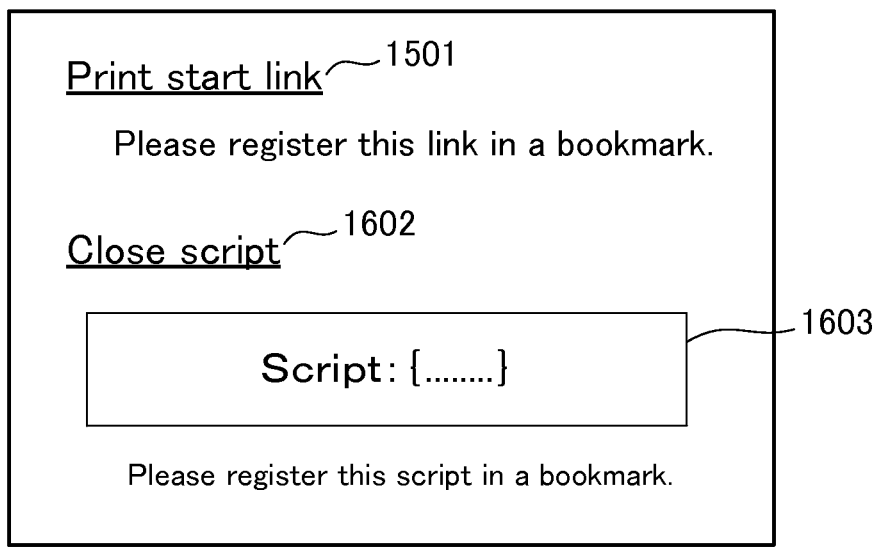
FIG. 16 is a diagram illustrating an example of content to be displayed on a tablet terminal.

FIG. 15 shows content for registering a bookmarklet, which is displayed when the browser of the tablet terminal 101 accesses the MFP 103. A user registers a link 1501 in a bookmark to register a print start script in a bookmarklet. The link being displayed may not be registered in a bookmark depending on a browser. In this case, a link 1502 for displaying the script is prepared. Upon selection of the link, a print start script 1603 is displayed as shown in FIG. 16. A user registers the script 1603 being displayed in a bookmark to register the bookmarklet. Upon selection of a link 1602, the content shown in FIG. 15 is displayed.

Essentially, the print start script is information not requiring disclosure to a user and only makes the user be confused even if it is displayed. If such a print start script is displayed, it may occupy no small area of a display area in a small screen of a tablet terminal or the like. However, such a print start script is essential information for a browser which is incapable of registering a bookmark from a link. Thus, the processing shown in FIG. 17 is executed to switch displaying a print start script depending on a browser to be accessed.

Figure 17:
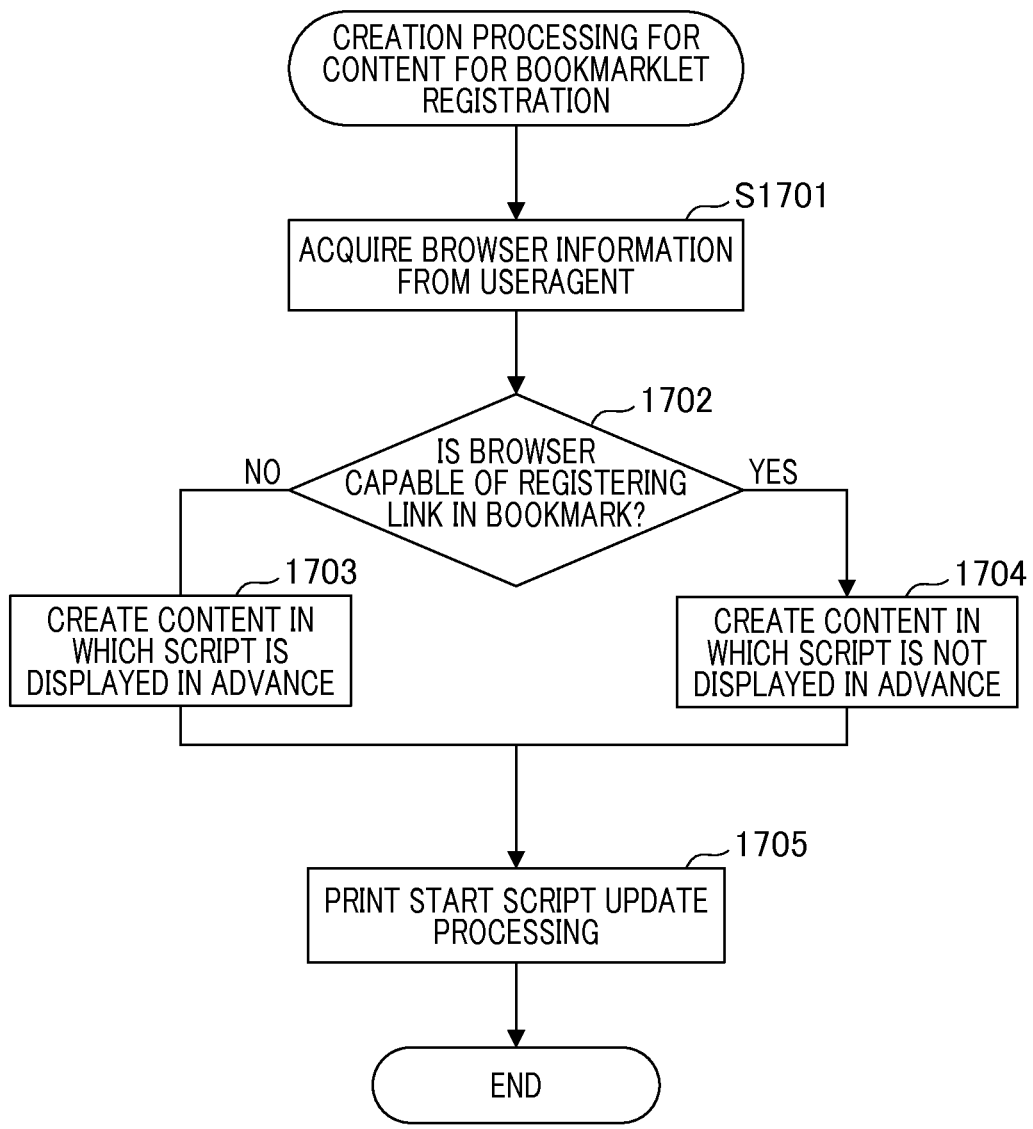
FIG. 17 is a flowchart illustrating content creation processing.

FIG. 17 is a flowchart illustrating the processing content of the MFP 103 when the tablet terminal 101 accesses content for bookmarklet registration. Firstly, browser information is acquired from UserAgent in step S1701. Note that the term "UserAgent" refers to software used for determining a browser. Next, it is determined in step S1702 as to whether or not the browser is capable of registering a link in a bookmark. If the browser is incapable of registering a link in a bookmark (NO), the processing proceeds to step S1703. On the other hand, if the browser is capable of registering a link in a bookmark (YES), the processing proceeds to step S1704. Content in which the script shown in FIG. 16 is displayed is created in step S1703. A content in which the script shown in FIG. 15 is not displayed is created in step S1704. Then, print start script update processing to be described below is performed in step S1705.

When a user inputs a job, the user makes settings according to the objective by using the print setting dialogue displayed in step S701 shown in FIG. 7. Here, resetting of the frequently-used settings every time is not easy to use. Hence, the processing for displaying content for bookmarklet registration shown in FIG. 18 to include the preferred setting values for a user in a bookmarklet.

Figure 18:
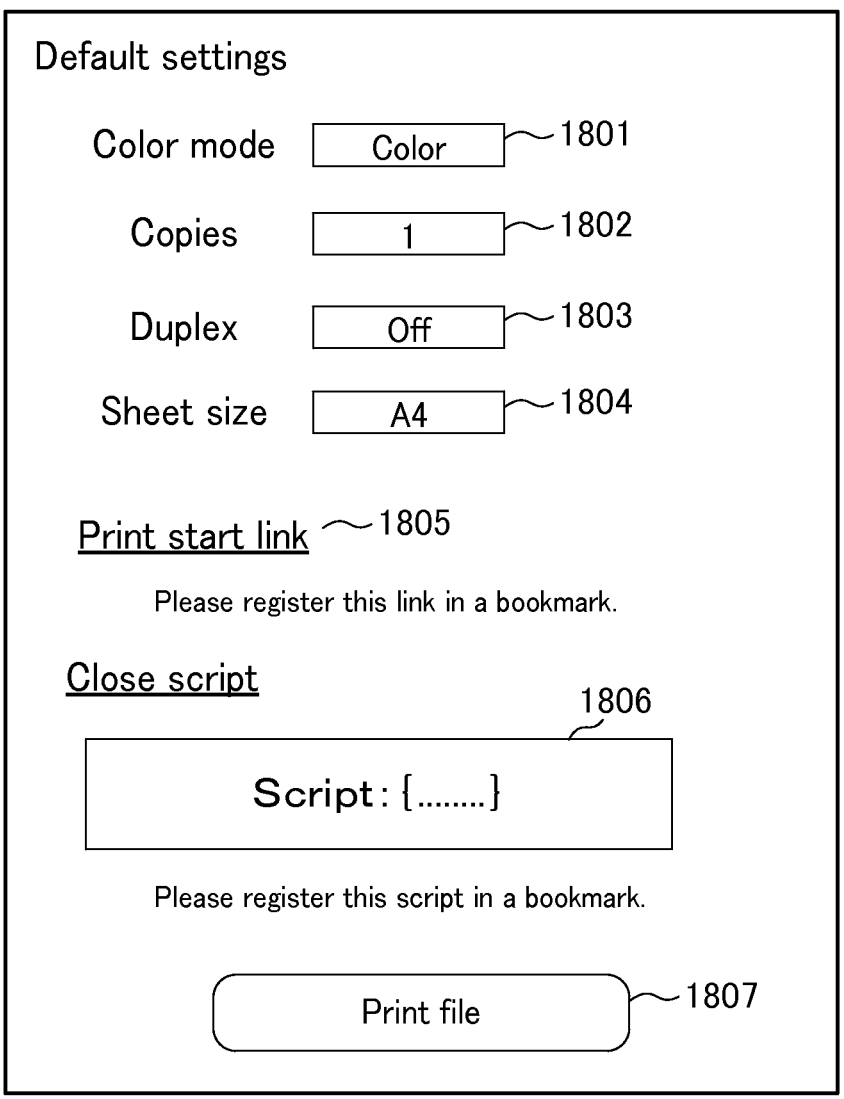
FIG. 18 is a diagram illustrating an operation screen of a tablet terminal.

FIG. 18 is a diagram illustrating an example of content for bookmarklet registration for a user. A link 1805 links a print start script. A print start script 1806 includes the default values for the print setting values. In step S1101 of displaying a print setting dialogue, the initial values of the respective parameters are reflected using the default values. Items 1801 to 1804 are items for specifying the default values of the parameters. If the user changes these parameters, the link 1805 and the default values in the script 1806 are updated.

A button 1807 for printing a file is a button which is not for printing content being displayed but for printing a file which is accessible from the browser of the tablet terminal 101 upon uploading the file. More specifically, the button 1807 is a button for printing a file which is accessible by the HTML input tag of type=file. If the button 1807 is selected, the processing in step S706 shown in FIG. 7 performs processing for converting a file selected by a user instead of content being displayed into an image which is printable by the MFP 103, and the MFP 103 performs printing for the converted image. In this case, the print start script and the print control script may be included in advance in content for bookmarklet registration.

Figure 19:
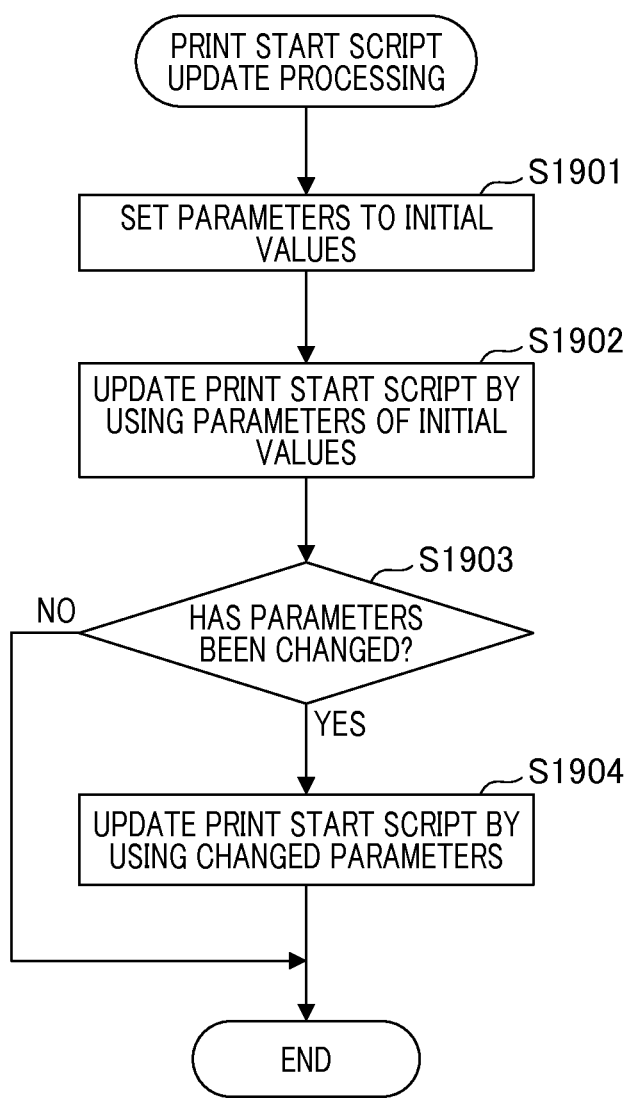
FIG. 19 is a flowchart illustrating script update processing.

FIG. 19 is a flowchart illustrating print start script update processing shown in FIG. 18. Firstly, the parameters for the setting values are set to initial values in step S1901. Next, the print start script is updated in step S1902 such that the parameters set to the initial values are included in the default values. Next, it is determined in step S1903 as to whether or not the parameters of the items 1801 to 1804 have been changed. If the parameters have been changed (YES), the processing proceeds to step S1904, whereas if no parameters have been changed (NO), the processing ends. Then, the print start script is updated in step S1904 such that the changed parameters are included in the default values. The print start script is executed by being registered in a bookmark, so that the dialogue in which the default values set in the items 1801 to 1804 are set in advance is displayed upon default value setting processing for the print dialogue in step S1101 shown in FIG. 11. In this manner, the user can execute printing with desired settings only by selecting the print start button.

As described above, according to the present embodiment, the MFP 103 can print content being displayed on a browser by a simple operation without dependence on an OS on the tablet terminal 101 side even if no specific driver is present.

OTHER EMBODIMENTS

The present invention also intends to include an apparatus, a system, and the method therefor which are configured by combining the above embodiments as appropriate.

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-033300, filed on Feb. 24 2014, which is hereby incorporated by reference wherein in its entirety.

What is claimed is:

1. A system comprising:
    an information processing apparatus; and
    an image processing apparatus,
    wherein the image processing apparatus comprises a transmitting unit configured to transmit a script for transmitting image data which is generated by rendering content displayed on a browser of the information processing apparatus through execution of the script by the information processing apparatus to the image processing apparatus in response to a request from the information processing apparatus,
    wherein the information processing apparatus comprises a transmitting unit configured to transmit the image data generated through execution of the script by the browser to the image processing apparatus, and
    wherein the image processing apparatus further comprises a printing unit configured to perform printing based on the image data, and
    wherein, if a size of the image data is larger than a predetermined size, the transmitting unit of the information processing apparatus divides the image data and then transmits the divided image data.

2. The system according to claim 1, wherein the transmitting unit of the image processing apparatus transmits the script embedding control for displaying a print setting dialogue.

3. The system according to claim 1, wherein the transmitting unit of the image processing apparatus transmits the script embedding control for changing content to be displayed on a dialogue according to the presence or absence of billing management for the image processing apparatus.

4. The system according to claim 1, wherein the transmitting unit of the image processing apparatus transmits the script based on information on the browser of the information processing apparatus.

5. The system according to claim 1, wherein the content is rendered on the browser through execution of the script.

6. The system according to claim 1, wherein the script is executed through execution of a bookmark at which the browser is registered.

7. An image processing apparatus comprising:
    a transmitting unit configured to transmit a script for transmitting image data which is generated by rendering content displayed on a browser of an information processing apparatus through execution of the script by the information processing apparatus to the image processing apparatus from a transmitting unit of the information processing apparatus in response to a request from the information processing apparatus; and
    a printing unit configured to perform printing based on the image data received from the information processing apparatus,
    wherein the transmitting unit of the information processing apparatus transmits the image data generated through execution of the script by the browser to the image processing apparatus, and
    wherein, if a size of the image data is larger than a predetermined size, the transmitting unit of the information processing apparatus divides the image data and then transmits the divided image data.

8. The image processing apparatus according to claim 7, wherein the transmitting unit of the image processing apparatus transmits the script embedding control for displaying a print setting dialogue.

9. The image processing apparatus according to claim 7, wherein the transmitting unit of the image processing apparatus transmits the script embedding control for changing content to be displayed on a dialogue according to the presence or absence of billing management for the image processing apparatus.

10. The image processing apparatus according to claim 7, wherein the transmitting unit of the image processing apparatus transmits the script based on information on the browser of the information processing apparatus.

11. A control method for a system comprising an information processing apparatus and an image processing apparatus, the method comprising:
    transmitting, by a transmitting unit of the image processing apparatus, a script for transmitting image data which is generated by rendering content displayed on a browser of the information processing apparatus through execution of the script by the information processing apparatus to the image processing apparatus in response to a request from the information processing apparatus;
    transmitting, by a transmitting unit of the information processing apparatus, the image data generated through execution of the script by the browser to the image processing apparatus; and performing printing, by the image processing apparatus, based on the image data,
wherein, if a size of the image data is larger than a predetermined size, the transmitting unit of the information processing apparatus divides the image data and then transmits the divided image data.

\* \* \* \* \*